(12) United States Patent
Neu et al.

(10) Patent No.: US 9,050,960 B2
(45) Date of Patent: Jun. 9, 2015

(54) PEDAL PROP FOR IMPOSING A LOAD ON A BRAKE PEDAL AND METHOD FOR CHECKING THE SEALING OF ONE OR MORE COMPONENTS OF A HYDRAULIC BRAKE SYSTEM

(75) Inventors: Thorsten Neu, Runkel (DE); Franziska Lang, Nidderau (DE)

(73) Assignee: Continental Teves AG & Co. oHG (DE)

(*) Notice: Subject to any disclaimer, the term of this patent is extended or adjusted under 35 U.S.C. 154(b) by 116 days.

(21) Appl. No.: 13/878,276

(22) PCT Filed: Jul. 28, 2011

(86) PCT No.: PCT/EP2011/062960
§ 371 (c)(1),
(2), (4) Date: Apr. 8, 2013

(87) PCT Pub. No.: WO2012/048923
PCT Pub. Date: Apr. 19, 2012

(65) Prior Publication Data
US 2013/0205882 A1   Aug. 15, 2013

(30) Foreign Application Priority Data

Oct. 13, 2010 (DE) .......................... 10 2010 042 415
Jul. 27, 2011 (DE) .......................... 10 2011 079 881

(51) Int. Cl.
*G01M 17/00* (2006.01)
*B60T 17/22* (2006.01)
*G05G 1/38* (2008.04)

(52) U.S. Cl.
CPC ............. *B60T 17/221* (2013.01); *B60T 17/223* (2013.01); *G05G 1/38* (2013.01)

(58) Field of Classification Search
CPC ..... B60T 17/22; B60T 17/221; B60T 17/223; G05G 1/38
USPC ........................................................... 73/132
See application file for complete search history.

(56) References Cited

U.S. PATENT DOCUMENTS 1,681,192 A * 8/1928 McBride ........................ 267/170
1,829,426 A * 10/1931 Welch .............................. 73/132

(Continued)

FOREIGN PATENT DOCUMENTS

DE     35 25 864 C1   11/1986
DE     40 37 688 A1    6/1992

(Continued)

OTHER PUBLICATIONS

International Search Report for PCT/EP2011/062960 mailed Jan. 16, 2012.

(Continued)

*Primary Examiner* — Eric S McCall
(74) *Attorney, Agent, or Firm* — RatnerPrestia

(57) ABSTRACT

A pedal prop for imposing a load on a brake pedal, in particular in motor vehicles, in order to apply the pressure necessary during sealing tests on components of the brake system, comprising a movable part, which changes the length of the pedal prop by moving in and out, and a fixed part, wherein the movable part is supported on a point of support on the motor vehicle. According to the invention, an evaluation and control unit is provided as an integrated element, which controls an actuator in order to provide an actuating force, wherein a displacement sensor and a force sensor are provided, by which a travel and an actuating force of the actuator can be sensed.

8 Claims, 3 Drawing Sheets

(56) References Cited

U.S. PATENT DOCUMENTS

| | | | |
|---|---|---|---|
| 1,877,367 A * | 9/1932 | Seppmann | 73/132 |
| 1,950,640 A * | 3/1934 | Wickliffe | 254/93 R |
| 3,602,043 A * | 8/1971 | Markey | 73/132 |
| 3,662,593 A * | 5/1972 | Pirrello et al. | 73/132 |
| 3,788,131 A * | 1/1974 | Markey | 73/132 |
| 3,977,241 A * | 8/1976 | Asmus et al. | 73/132 |
| 4,186,595 A | 2/1980 | Domitter | |
| 5,168,750 A * | 12/1992 | Kurtz | 73/132 |
| 5,172,589 A * | 12/1992 | Witt | 73/132 |
| 5,483,825 A * | 1/1996 | Greenbaum | 73/132 |
| 6,363,774 B2 * | 4/2002 | Duff | 73/40 |
| 6,681,620 B2 * | 1/2004 | Sakamoto et al. | 73/132 |
| 6,736,003 B2 * | 5/2004 | Takeda et al. | 73/132 |
| 7,021,131 B2 * | 4/2006 | Harrison et al. | 73/132 |
| 7,313,951 B2 * | 1/2008 | Robinson et al. | 73/132 |
| 8,670,896 B2 * | 3/2014 | Hodorek et al. | 701/33.2 |
| 2001/0045124 A1 * | 11/2001 | Mouck et al. | 73/132 |
| 2003/0062767 A1 | 4/2003 | Greaves, Jr. | |
| 2005/0072222 A1 * | 4/2005 | Harrison et al. | 73/132 |
| 2009/0056432 A1 * | 3/2009 | Steininger | 73/132 |

FOREIGN PATENT DOCUMENTS

| | | |
|---|---|---|
| DE | 42 10 673 A1 | 10/1993 |
| DE | 103 27 693 A1 | 1/2005 |
| EP | 0 392 188 A1 | 10/1990 |
| EP | 2 330 003 A1 | 6/2001 |
| FR | 2 793 204 | 11/2000 |
| WO | WO 99/65747 | 12/1999 |

OTHER PUBLICATIONS

German Search Report for German Patent Application No. 10 2011 079 881.1 mailed Jun. 14, 2012.

\* cited by examiner

PEDAL PROP FOR IMPOSING A LOAD ON A BRAKE PEDAL AND METHOD FOR CHECKING THE SEALING OF ONE OR MORE COMPONENTS OF A HYDRAULIC BRAKE SYSTEM

CROSS REFERENCE TO RELATED APPLICATIONS

This application is the U.S. National Phase Application of PCT/EP2011/062960, filed Jul. 28, 2011, which claims priority to German Patent Application Nos. 10 2010 042 415.3, filed Oct. 13, 2010 and 10 2011 079 881.1, filed Jul. 27, 2011, the contents of such applications being incorporated by reference herein.

FIELD OF THE INVENTION

The invention relates to a pedal prop for imposing a load on a brake pedal and to a method for checking the sealing of one or more components of a hydraulic brake system.

BACKGROUND OF THE INVENTION

A pedal prop shown in FIG. 1 is known, being made by ATE for example. With the known pedal prop (also referred to as a pedal fixing device), it is possible to impose a load on the brake pedal and to fix it in the desired position. This makes it possible for service personnel, for example, to maintain a constant pedal displacement over a prolonged period.

The pedal prop is an aid for carrying out sealing tests on the hydraulic brake system (brake booster, master cylinder, cut-out etc.) and for testing and adjusting brake-force regulators or brake-force limiters.

To build up pressure, the pedal prop is clamped between the driver's seat and the brake pedal. The length of the pedal prop is adjusted with the aid of a hand wheel, which acts on a rack. Once the desired load has been achieved, a pawl locks the length of the pedal prop and ensures a constant pedal displacement and, in the case of a leaktight brake system, a constant pressure.

It is regarded as disadvantageous in the known pedal props that there is no information on the fixing force or the change in the latter during the support operation.

SUMMARY OF THE INVENTION

An aspect of the invention is an improved pedal prop and simplified and improved testing of sealing to be achieved by means of structural and methodological measures.

According to an aspect of the invention, this is achieved for a pedal prop of the type stated by means of 1) an evaluation and control unit is provided as an integrated element, which controls an actuator in order to provide an actuating force, wherein a displacement sensor and a force sensor are provided, by which a travel and an actuating force of the actuator can be sensed, 2) generation of a manually produced initial force by positioning the pedal prop between a brake pedal and a point of support on the motor vehicle and moving the movable part relative to the fixed part by means of a hand wheel, with the result that the pedal prop is clamped between the brake pedal and the point of support, setting an actuating force by means of the evaluation and control unit, buildup of the actuating force by means of the actuator, measurement of a travel (x) of the actuator over a certain measurement time (t), calculation of the leakage rate from the product of the travel (x) and a diameter of a piston of the component, and 3) generation of a manually produced initial force by positioning the pedal prop between a brake pedal and a point of support on the motor vehicle and moving the movable part relative to the fixed part by means of a hand wheel, with the result that the pedal prop is clamped between the brake pedal and the point of support, setting of a starting force value for the actuating force by means of the evaluation and control unit, holding the actuator position while measuring the displacement sensor), measurement of the drop in force over a certain measurement time (t), calculation of the leakage rate of the component from the drop in force over the measurement time (t).

This is achieved by an evaluation and control unit provided as an integrated element, which controls an actuator in order to provide an actuating force, wherein a displacement sensor and a force sensor are provided, by means of which a travel and an actuating force of the actuator can be sensed. Thus, the advantage of the invention consists in that the sealing of a brake component can be verified in a simple and improved way, e.g. as part of customer service or in a garage.

Moreover, a method for checking the sealing of one or more components of a hydraulic brake system, in particular of a brake booster, of a master cylinder or of a hydraulic cut-out, by means of a pedal prop according to an aspect of the invention.

BRIEF DESCRIPTION OF THE DRAWINGS

Further features, advantages and possible uses of the invention will emerge from the dependent claims and the following description of an illustrative embodiment with reference to drawings, in which:

DETAILED DESCRIPTION OF THE INVENTION

Figure 1:
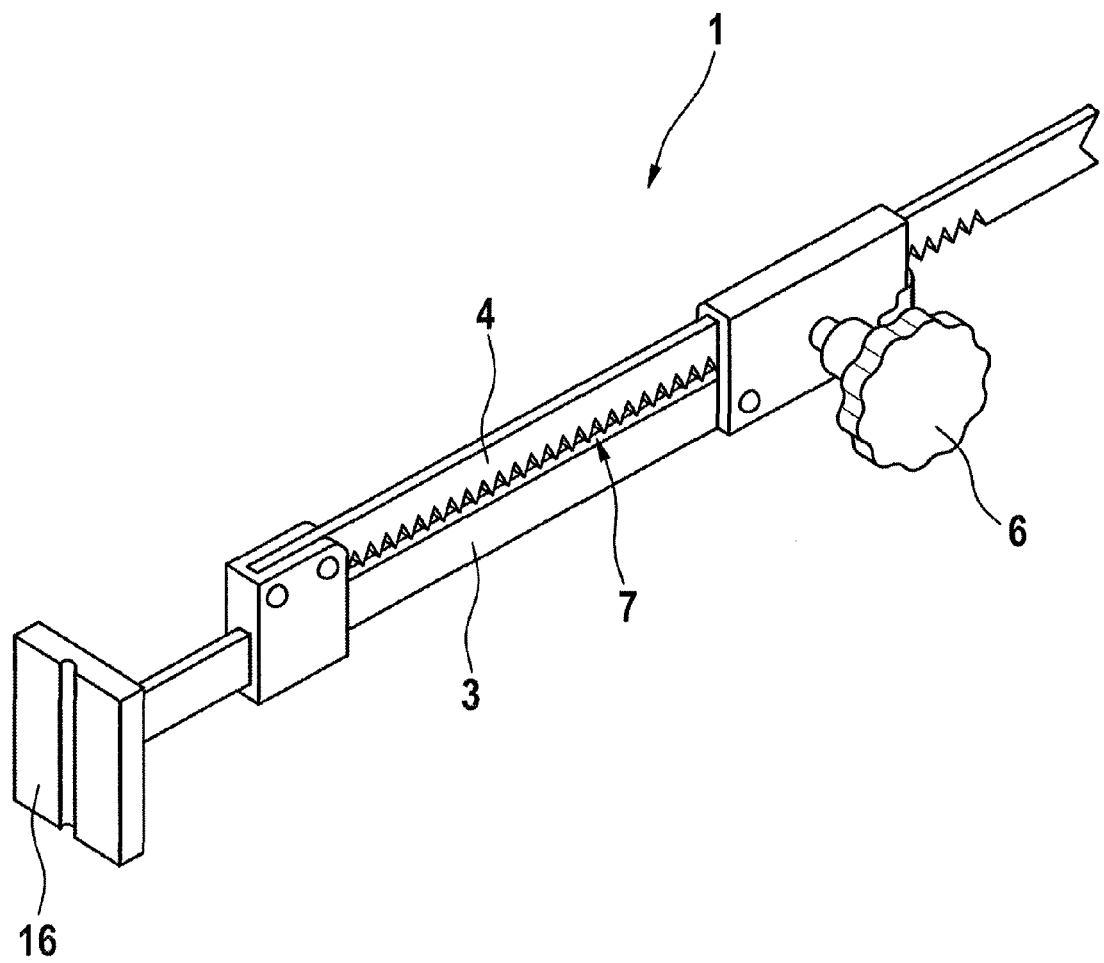
FIG. 1 shows a known pedal prop made by ATE.

FIG. 1 shows a known pedal prop 1 for imposing a load on a brake pedal 2, in particular in motor vehicles, in order to apply the pressure necessary during sealing tests on components of the brake system.

Brake boosters, master cylinders, cut-outs etc. can be provided as components of the hydraulic brake system, for example. The pedal prop 1 comprises a movable part 4, which changes the length of the pedal prop 1 by moving in and out, and a fixed part 3, which is supported by means of a support element 16 on the brake pedal 2. The movable part 4, on the other hand, is supported on a point of support 5 on the motor vehicle.

Pedal props 1 of this kind are known, being made by ATE for example. With the known pedal prop (also referred to as a pedal fixing device), it is possible to impose a load on the brake pedal 2 and to fix it in the desired position. This makes it possible for service personnel, for example, to maintain a constant pedal pressure over a prolonged period.

To build up pressure, the pedal prop 1 is clamped between the driver's seat or a point of support 5 and the brake pedal 2. The length of the pedal prop 1 is adjusted with the aid of a hand wheel 6, which acts on a rack 7 formed on the movable part 4. Once the desired load has been achieved, a pawl 8 locks the length of the pedal prop 1 and thus ensures the constant pressure in the brake system. It is regarded as disadvantageous here that there is no information on the fixing force or the change in the latter during the support operation.

Figure 2:
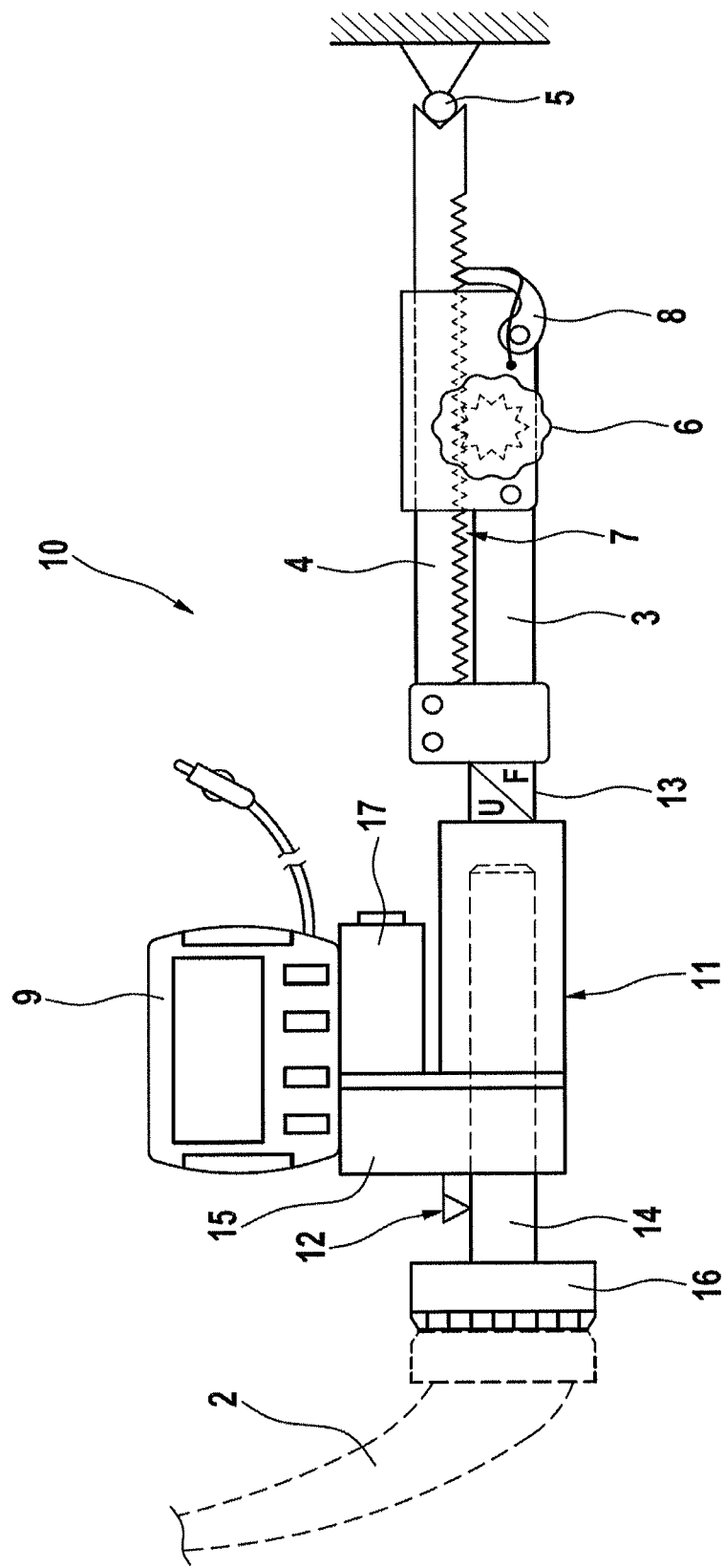
FIG. 2 shows a pedal prop according to the invention.

In order to eliminate this disadvantage of the known pedal props 1, the pedal prop 10 according to the invention, which is illustrated in FIG. 2, has an integrated evaluation and control unit 9, which controls an electric motor 17 of an actuator 11 in order to provide an actuating force.

A displacement sensor 12 and a force sensor 13 are furthermore provided, by means of which a travel and an actuating force of the actuator 11 can be sensed.

By way of example, the actuator 11 can be provided as a linear electric cylinder with a linear-motion piston 14, the travel of which is detected by the displacement sensor 12, which is arranged on or integrated into a housing 15 of the actuator 11 in a simple manner. Secured on the piston 14 is the support element 16, which rests against the brake pedal 2.

As can be seen from FIG. 2, the force sensor 13 is arranged between the housing 15 of the actuator 11 and the fixed part 3 and converts the pedal fixing force of the pedal prop 10 into an electric signal, which is converted into information on the sealing of one (or more) brake components by the electric programmable evaluation and control unit 9 in accordance with the method described below.

The sealing of one or more components of the hydraulic brake system is checked in the steps presented below:
first of all, a manual initial force is generated by positioning the pedal prop 10 between the brake pedal 2 and the point of support 5 on the motor vehicle and moving the movable part 4 relative to the fixed part 3 by means of the hand wheel 6, with the result that the pedal prop 10 is gripped between the brake pedal and a point of support, being secured by the engagement of the pawl 8. From this manually produced initial force, automated operation of the pedal prop 10 can be started.

Two functions—"constant force" and "constant displacement"—are provided here.

In the "constant force" function, an actuating force is first of all set by means of the evaluation and control unit 9, which controls the actuator 11, with the result that it builds up the actuating force.

A measurement of a travel x of the actuator 11 or of the piston 14 thereof is then carried out over a certain measurement time t.

By means of a suitable algorithm, the leakage rate is then calculated from the product of the travel x and a diameter of a piston of the component.

The leakage rate of the component is indicated in the evaluation and control unit 9.

Figure 3:
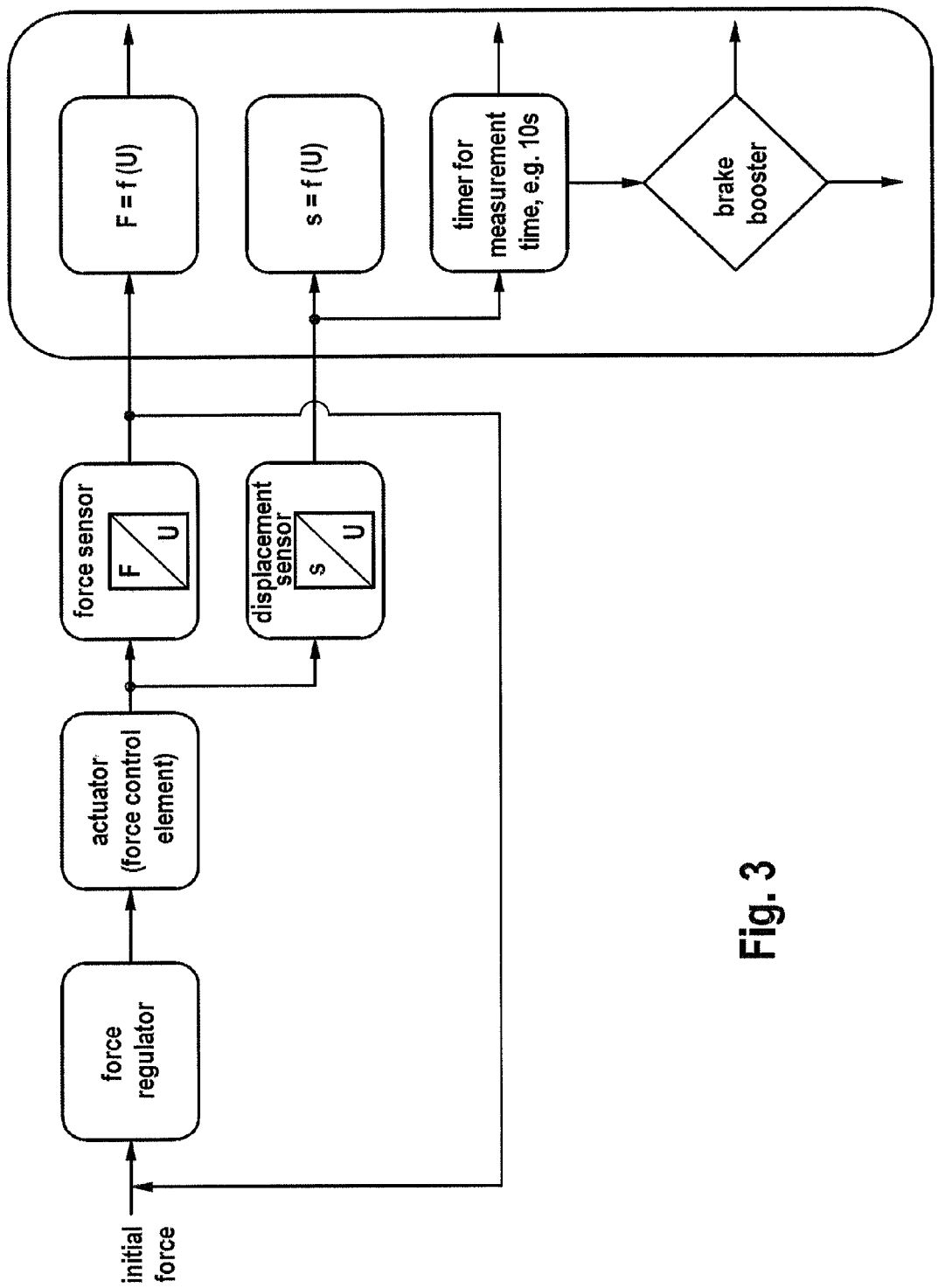
FIG. 3 shows a block diagram of the pedal prop according to the invention as shown in FIG. 2.

A corresponding block diagram of the "constant force" function is shown in FIG. 3.

In the "constant displacement" function, a starting force value for the actuating force is first of all set by means of the evaluation and control unit 9. If this control variable is sufficiently accurate, measurement starts. During this process, the actuator position or the position of the piston 14 is held while measuring the displacement sensor 12, and the drop in force over a certain measurement time t is measured. By means of a suitable algorithm, the leakage rate of the component is measured from the drop in force over the measurement time t, and the leakage rate is indicated in the evaluation and control unit 9.

Using a motor vehicle type database stored in the evaluation and control unit 9, the evaluation and control unit 9 is in both cases made to display whether the permitted values have been exceeded and whether therefore there is an actionable fault or whether the motor vehicle behavior is within the permitted range.

LIST OF REFERENCE SIGNS 1 known pedal prop
2 brake pedal
3 fixed part
4 movable part
5 point of support
6 hand wheel
7 rack
8 pawl
9 evaluation and control unit
10 pedal prop according to the invention
11 actuator
12 displacement sensor
13 force sensor
14 piston
15 housing
16 support element
17 electric motor

The invention claimed is:

1. A pedal prop for use in motor vehicles for imposing a load on a brake pedal in order to apply the pressure necessary during sealing tests on components of a brake system, comprising:
a movable part, which changes a length of the pedal prop by moving in and out, and
a fixed part,
wherein the movable part is supported on a point of support on the motor vehicle,
wherein an evaluation and control unit is provided as an element integral to the pedal prop, which controls an actuator in order to provide an actuating force, and
wherein a piston travel distance measuring sensor and a force sensor are provided, by which a travel and an actuating force of the actuator can be sensed.

2. The pedal prop as claimed in claim 1, wherein the actuator is provided as a linear electric cylinder with a linear-motion piston.

3. The pedal prop as claimed in claim 1, wherein the force sensor is arranged between a housing of the actuator and the fixed part.

4. The pedal prop as claimed in claim 3, wherein the displacement sensor is arranged on the housing of the actuator.

5. A method for checking the sealing of one or more components of a hydraulic brake system, including a brake booster, of a master cylinder or of a hydraulic cut-out, by a pedal prop for use in motor vehicles for imposing a load on a brake pedal in order to apply the pressure necessary during sealing tests on components of the brake system, the pedal prop comprising:
a movable part, which changes a length of the pedal prop by moving in and out, and a fixed part, wherein the movable part is supported on a point of support on the motor vehicle, wherein an evaluation and control unit is provided as an element integral to the pedal prop, which controls an actuator in order to provide an actuating force, and wherein a displacement sensor and a force sensor are provided, by which a travel and an actuating force of the actuator can be sensed, the method comprising:
a. generation of a manually produced initial force by positioning the pedal prop between a brake pedal and a point of support on the motor vehicle and moving the movable part relative to the fixed part by means of a hand wheel, with the result that the pedal prop is clamped between the brake pedal and the point of support,
b. setting an actuating force by means of the evaluation and control unit,
c. buildup of the actuating force by means of the actuator,
d. measurement of a travel (x) of the actuator over a certain measurement time (t), and e. calculation of the leakage rate from the product of the travel (x) and a diameter of a piston of the component.

6. The method for checking the sealing of a component of a hydraulic brake system as claimed in claim 5, wherein a leakage rate of the component is indicated in the evaluation and control unit.

7. A method for checking the sealing of one or more components of a hydraulic brake system of a master cylinder or of a hydraulic cut-out, by a pedal prop for use in motor vehicles for imposing a load on a brake pedal in order to apply the pressure necessary during sealing tests on components of the brake system, the pedal prop comprising:

a movable part, which changes a length of the pedal prop by moving in and out, and a fixed part, wherein the movable part is supported on a point of support on the motor vehicle, wherein an evaluation and control unit is provided as an element integral to the pedal prop, which controls an actuator in order to provide an actuating force, and wherein a displacement sensor and a force sensor are provided, by which a travel and an actuating force of the actuator can be sensed, the method comprising:

a. generation of a manually produced initial force by positioning the pedal prop between a brake pedal and a point of support on the motor vehicle and moving the movable part relative to the fixed part by means of a hand wheel, with the result that the pedal prop is clamped between the brake pedal and the point of support, b. setting of a starting force value for the actuating force by means of the evaluation and control unit, c. holding the actuator position while measuring the displacement sensor, d. measurement of the drop in force over a certain measurement time (t), and e. calculation of the leakage rate of the component from the drop in force over the measurement time (t).

8. The method for checking the sealing of a component of a hydraulic brake system as claimed in claim 7, wherein a leakage rate of the component is indicated in the evaluation and control unit.

* * * * *